United States Patent [19]
Kim et al.

[11] Patent Number: 5,110,733
[45] Date of Patent: May 5, 1992

[54] LIQUID-LIQUID EXTRACTION WITH PARTICULATE POLYMERIC ADSORBENT

[75] Inventors: Chan W. Kim; Elizabeth M. Robinson, both of Cambridge; Chokyun Rha, Boston, all of Mass.

[73] Assignee: Rohm and Haas Company, Philadelphia, Pa.

[21] Appl. No.: 453,354

[22] Filed: Dec. 21, 1989

Related U.S. Application Data

[63] Continuation of Ser. No. 34,655, Apr. 10, 1987, abandoned, which is a continuation-in-part of Ser. No. 854,985, Apr. 28, 1986, abandoned.

[51] Int. Cl.⁵ .................. C12N 9/00; B01D 11/04; B01D 15/04
[52] U.S. Cl. ................. 435/183; 210/634; 210/638; 530/363; 435/206; 435/208
[58] Field of Search ............. 435/183, 206, 208; 210/634, 638; 530/363

[56] References Cited

U.S. PATENT DOCUMENTS 4,690,892  9/1987  Ananthapadmanabhan et al. ........... 435/185
4,743,550  5/1988  Ananthapadmanabhan et al. ........... 435/220

*Primary Examiner*—David M. Naff
*Assistant Examiner*—Jon P. Weber
*Attorney, Agent, or Firm*—John E. Taylor, III

[57] ABSTRACT

The extraction or purification of biomaterials and other products by liquid-liquid extraction in an aqueous system is enhanced by introducing a particulate polymeric adsorbent into the extraction system and agitating the system, whereupon the adsorbent reversibly binds the product or material to be separated from the product, to form a complex, and the complex preferentially partitions into one of the liquid phases. The complex is then separated, and the product recovered from the complex or the remaining liquid. Ion exchange resins comprising beads or ground particles, of 0.01-10 micrometer average diameter, are representative adsorbents.

17 Claims, No Drawings

LIQUID-LIQUID EXTRACTION WITH PARTICULATE POLYMERIC ADSORBENT

This application is a continuation of prior application Ser. No. 034,655 filed Apr. 10, 1987, now abandoned, which is a application Ser. No. 854,985, filed Apr. 28, 1986, now abandoned.

TECHNICAL FIELD

This invention relates to liquid-liquid extraction in aqueous systems for the separation and for purification of a variety of substances, particularly biologically active materials.

BACKGROUND OF THE INVENTION

Liquid-liquid extraction in aqueous systems has received much attention for separation or purification of biomaterials and other products. In this specification, "biomaterial" means any water soluble or water insoluble, bio-affecting substance, whether of biological or non-biological origin. Biomaterials include compounds, molecules, polymers, particles and simple as well as complex substances which exist in nature or which may be synthesized by biological or non-biological processes. The term thus includes proteinaceous substances (such as albumins and enzymes), amino acids, nucleic acids, peptides and polypeptides, antibodies, antigens, steroids, hormones, cells, cell fragments, extracts and debris, fermentation products and derivatives, and pharmaceuticals of all kinds, including antibiotics, polymeric carbohydrates, and the like.

Although the separation and purification of useful biomaterials is a significant concern of the present invention, the invention is also applicable to monbiomaterials, such as pigments, particulate matter and organic solutes of all kinds. Accordingly, as used hereinafter, the term "product(s)" means useful biomaterials or non-biomaterials which can be separated by the methods of the invention.

Liquid-liquid extraction with at least two aqueous phases is especially appropriate for separation and purification of biomaterials from aqueous systems because aqueous phase systems, as compared with immiscible organic-water phase systems, are mild in their response to biomaterials, primarily due to high water content and the ability to sustain physiological conditions in the systems due to the presence of sugars, salts, buffers and other low molecular weight substances. Accordingly, aqueous liquid-liquid extraction systems are effective for partitioning of complex and fragile substances, including cells and cell constituents, while retaining requisite viability and/or biological activity.

In general terms, aqueous liquid-liquid extraction involves addition to water of two or more substances (extractants) which are water-soluble but mutually immiscible. To this system is then added a mixture containing the material which it is desired to extract. The aqueous mixture comprising the extractants and the material to be extracted is then agitated and permitted to equilibrate, whereupon the extractants separate into liquid layers accompanied by partitioning of the desired material into one or several of the phases or interfaces thereof. If the material to be extracted is water soluble, it will partition primarily into one or more of the liquid phases. Water insoluble or particulate material, such as cells or cell fragments, may partition not only to one or more of the liquid phases but also to any interface between the phases.

Taking a two liquid aqueous phase system as representative, the distribution of a material to be extracted is defined by the partition coefficient, $K_p$, as the ratio of equilibrium concentration of the partitioned material in the top and bottom phases, respectively: $K_p = C_t/C_b$ (Equation 1). Since partitioning depends upon the properties not only of the extractants constituting the liquid phases but also on characteristics of the partitioned solute, especially surface properties, the partition coefficient $K_p$ is the sum of several contributing factors:

$$\ln K_p = \ln k_{el} + \ln k_{hydrophob} + \ln k_{hydrophil} + \ln k_{conf} + k_{lig} \quad \text{(Equation 2)}$$

where $k_{el}, k_{hydrophob}, k_{hydrophil}, k_{conf}$ and $k_{lig}$ are the partition coefficient factors due to electrical, hydrophobic, hydrophilic, conformational and ligand effects, respectively. Albertsson, J. of Chromatography 159:111–122(178); M. Ramstorp, "Novelty Affinity Techniques," Thesis, Department of Pure and Applied Biochemistry, University of Lund, Sweden, 1983, Page 26.

If the partitioned material is particulate, other factors will contribute to the partition coefficient because of the possibility of partitioning of the particulate matter to the interface between the liquid phases (Albertsson, Advance in Protein Chemistry 24:309–341, 1970). It will be evident from the composite partition coefficient (Equation 2) that partitioning can be substantially affected by changes in hydrophobic and hydrophilic character as well as by charge and material density, structure, molecular weight, molecular weight distribution, the presence of ligands for the solute, and biospecific attraction.

Modification of partitioning behavior for the purpose of enhancing the proportion of material which concentrates in a given phase of a liquid-liquid extraction system is therefore a highly desirable objective, particularly if it can be achieved, in the case of biomaterials, without substantial injury to the partitioned material, either by reason of loss of compositional or structural integrity or because of diminution of biological activity.

Heretofore, desired improvements in liquid-liquid extraction have focused on selection of the extractants, as in U.S. Pat. No. 4,144,130 to Kula et al and 4,508,825 to Kim et al. In the Kula et al patent, as further explained in H. Hustedt et al, Biotechnology and Bioengineering, Volume XX, 1989–2005 (1978), enzymes are effectively recovered from cells and cell fragments by multiphase liquid separation wherein the extractant liquids comprise the combination of a high molecular weight compound and an inorganic salt, or the combination of at least two high molecular weight compounds. Representative of the first combination is a polyethylene glycol (PEG)-potassium phosphate buffer (PPB) pair or a PEG-dextran pair.

In a similar approach, Kim et al separate extracellular protease and amylase from a fermentation broth by the addition of PEG and a cationic epihalohydrin-polyamine copolymer or a dextran polymer.

In another approach, focusing on purification of specific proteins, Johansson modified the PEG by attachment of functional groups which introduced surface charges. He was thus able to improve the partitioning of three different albumins. Biochim. Biophys. Acta, 222 (1970), 381,389.

Jizomoto improved the separation of animal tissue albumin and gum arabic by varying the molecular weight of the polyethylene glycol extractant. J. Pharmaceutical Sci. 74, No. 4, Apr. 1985, 469–472.

Others have employed affinity partitioning for purification of proteins and other substances by adding a material capable of coupling to the polymeric extractant, the resulting polymer-ligand then partitioning predominately into one of the liquid phases. Flanagan et al, J. of Biological Chemistry, 250, No. 4, Feb. 25, 1975, 1484–1489.

Still others have examined the effect of pH on a system and have determined that proteins can be forced to partition according to their isoelectric points as a result of adding charged polymers. Johansson et al, European Journal Biochemistry, 33,379 (1973).

Nevertheless, despite the advances in the art, the known extraction systems are limited in their applicability, and only specific partitionable materials (such as certain proteins) have benefitted. Accordingly, a method of enhancing liquid-liquid extraction having more general applicability and capability of large scale operation will have substantial value.

SUMMARY OF THE INVENTION

It has now been found that partitioning of a material (hereinafter called "adsorbed material") which it is desired to separate by means of liquid-liquid extraction in an aqueous system, is enhanced by modification of the extraction system with a particulate polymeric adsorbent. The polymeric adsorbent particles reversibly bind the adsorbed material to form a complex. In most cases the adsorbed material will be a product (as defined above) but the adsorbed material can also comprise impurities and other undesired substances. The complex (a composite of polymeric adsorbent and reversibly attached adsorbed material) is carried into one of the phases or to an interface thereof to a greater extent than is achievable upon partitioning of a material which has not been complexed. The partitioned complex is then separated from the extraction system and product is recovered in the filtrate or is recovered from the complex by one or more conventional desorption techniques.

The adsorbent particles may be charged or uncharged. A charged state may be achieved by the presence of functional groups which modify the hydrophobic/hydrophilic character of an adsorbent relative to the liquid extractants in the aqueous system. Typical of a charged adsorbent is a particulate ion exchange resin wherein the ion exchange functionality imparts a surface charge to a polymer.

If the particulate polymeric adsorbent is a charged material, the mechanism by which a material is bound into the complex may primarily be electrostatic attraction. If the adsorbent is uncharged, and even to some extent when the adsorbent is charged, the binding mechanism and partitioning may be understood in terms of one or more of hydrophobic/hydrophilic attraction, specific affinity interaction, and conformational, ligand formation and other effects, as indicated by Equation 2.

Accordingly, in one aspect of the invention, a liquid-liquid extraction method is provided for separating or purifying a product in an aqueous environment, the essential steps of the method comprising:

(A) agitating an aqueous solution or dispersion of (1) the product mixed in a matrix with other (undesired) material, (2) a plurality of water soluble, mutually immiscible substances which are present in amounts effective to maintain separation of multiple aqueous liquid phases, and (3) a particulate polymeric adsorbent, whereby the adsorbent reversibly binds the adsorbed material to form a complex;

(B) causing the system resulting from step (A) to separate into multiple liquid aqueous phases, whereby a predominant portion of the complex partitions into one of the phases or to an interface thereof; and (C) recovering the product from the complex, or from the aqueous phase or interface in which it has concentrated.

In other aspects of the invention, the product is a biomaterial, the particulate polymeric adsorbent is characterized by the presence of ionogenic groups or by hydrophobic/hydrophilic binding properties, e.g., binding by van der Waals forces, and comprises an ion exchange resin of micrometer or submicrometer particle size, e.g., in the range of about 0.01 to about 10 micrometers. Preferably, the resin particles carry a charge opposite the charge on the biomaterial.

By virtue of the invention, enhanced separation and/or purification of a wide variety of biomaterials and other products is achievable without denaturing or other inactivation or degradation of the material. Furthermore, the partitioning in some cases is selective for one of the liquid phases (for example, into a PEG phase rather than into a dextran phase), thereby facilitating further separation by reason of concentration in a more desirable liquid. Other benefits include improved efficiency of aqueous liquid-liquid extraction processes, suitability of practice on a large scale, improved yields, adaptability to continuous processes, opportunity for substantial savings in capital investment because the ease of separation of the phases permits the use of smaller scale equipment, and other advantages resulting from the wide variety of biomaterials and other products to which the method is applicable.

DETAILED DESCRIPTION

In the liquid-liquid extraction method of the invention, a plurality of water soluble, mutually immiscible substances are added to water in amounts effective for phase separation upon agitation followed by equilibration and quiescent conditions.

Extensive studies have been made of water soluble substances useful as phase-forming materials in aqueous systems (see references cited above). By way of summary but not limitation, these substances include polymeric materials alone or in combination with salts and other water soluble compounds. While simple liquid-liquid extraction systems are constituted by a pair of such liquid phase-forming substances, more than two such different substances have also been used, resulting in a number of phases equal to the number of different immiscible substances.

For each extraction system, the amounts of the extractants are easily selected so that phase separation will occur. Representative multiple phase systems are the following wherein the percentage is the concentration of the substance in the aqueous system: two-phase systems: dextran (11.1%)-polyethylene glycol (8.9%); three-phase systems: dextran (6.67%)-non-ionic synthetic sucrose polymer (8%)-polyethylene glycol (5.33%); and four-phase systems: dextran (5%)-nonionic synthetic sucrose polymer (6%)-polyethylene glycol (4%)-polypropylene glycol (25%). (Albertsson, Biochemistry, Volume 12, No. 13, 1973, Page 2526.)

Generally, suitable liquid phase-forming substances include polyalcohols, polyethers, polyesters, polyvinyl pyrrolidones and inorganic salts. Specific extractants are polyethylene glycol, polypropylene glycol, methoxy polyethylene glycol, trimethyl amino polyethylene glycol, polyethylene glycol sulfonate, polyvinyl alcohol, polyvinyl pyrroldone, methylcellulose, ethylhydroxy ethyl cellulose, DEAE-cellulose, alkali metal carboxy methylcellulose, dextran, hydroxy propyl dextran, DEAE-dextran, dextran sulfate, alkali metal carboxy methyldextran, non-ionic synthetic sucrose polymer, and alkali metal sulfates and phosphates such as potassium phosphate. Specific phase-forming pairs which have been extensively investigated and preferred for use in the present invention include polyethylene glycoldextran, polyethylene glycol-potassium phosphate, and polyethylene glycol-magnesium sulfate.

The patent and other literature disclosing the foregoing and other liquid-liquid aqueous extraction systems useful in the present invention includes U.S. Pat. Nos. 4,144,130 - Kula et al and 4,508,825 - Kim et al, and the following articles: Hustedt et al in Biotechnology and Bioengineering, Volume xx 1989-2005 (1978); Edmond et al, Biochem. J., 109, 569-576 (1968); Saeki et al, Polymer, Volume 18, 1027-1031 (Oct. 1977); Knoll et al, Journal of Biological Chemistry, Volume 258, No. 9, Issue of May 10, 1983, 5710-5715; Fisher et al, Biochem. Biophys. Acta, 801 (1984) 106-110; Johansson, Biochem. Biophys. Acta, 222 (1970) 381-389; Alberts, Biochemistry, Volume VI, No. 8, Aug. 1967 (2527-2532); Flanagan et al, The Journal of Biological Chemistry, Volume 250, No. 4, Issue of Feb. 25, 1975 (1484-1489); Jizomoto, Journal of Pharmaceutical Sciences, Volume 74, No. 4, Apr. 1985 (469-472); Albertsson, Biochemistry, Volume 12, No. 13, 1973 (2525-2530); and the thesis by Ramstorp, cited above. All of the foregoing patents and publications are incorporated herein by reference.

As is apparent from the patents and literature cited above and examples set forth below, the molecular weight of the phase-forming substance and the ionic environment of the extraction system will have considerable influence on the partitioning effects. Concentration of the substances, temperature and pH are additional conditions which influence partition.

The particulate polymeric adsorbent to be admixed with the plurality of liquid phase-forming substances in an aqueous medium generally is a known material and may be either charged or uncharged depending upon the biomaterial or other product to be extracted. If the material to be extracted is uncharged, then other binding forces, e.g., van der Waals forces, will govern coupling or complexing with the adsorbent.

Any water-insoluble polymeric adsorbent material which is compatible with and preferably chemically inert to the phase-forming substances, and which can interact with but not denature the biomaterials or other products to be extracted, can be used. Typical of the adsorbents are homopolymers and copolymers formed from vinylidene monomers such as acrylic and methacrylic acids and esters, and other monoethylenically unsaturated monomers or mixtures thereof, such as monocyclic and polycyclic aromatic monomers, e.g., styrene and substituted styrenes, and the like. The monoethylenically unsaturated monomers may be polymerized without crosslinking or may be crosslinked in situ with a polyethylenically unsaturated monomer such as a polyvinyl aromatic hydrocarbon (divinyl benzene, divinyl toluene, etc.), a glycol dimethacrylate such as ethylene glycol dimethacrylate, or a polyvinyl ether of a polyhydric alcohol, such as divinoxyethane and trivinoxypropane.

The polymeric adsorbents are prepared in a conventional manner including bulk, solution, suspension and emulsion polymerization. If the polymerization process is an emulsion polymerization, the desired small particle size range can be obtained directly, as shown in U.S. Pat. Nos. 4,359,537 and 4,380,590 to Chong, U.S. Pat. Nos. 4,200,695 to Chong, Isacoff and Neely, and U.S. Pat. No. 4,537,683 to Isacoff and Neely, all of such patents being incorporated herein by reference. If the polymerization is suspension or other form, the particulate product polymers can be reduced in size by grinding techniques well known in the art.

In the case of polymeric adsorbents having an ion exchange functional group or an affinity group, and useful in the process of the present invention, the particle size is generally 0.01 micrometer to 10 micrometers in diameter, preferably 0.01 micrometer to 5 micrometers, and even more preferably 0.05 to 2 micrometers. Unfunctionalized polymers which attach to adsorbed materials by hydrophobic/hydrophilic bonding are useful in the same particle size range but particles in the range to 0.05 to 5 micrometers are preferred. Irregularly shaped particles (e.g., ground resins) are assumed, for purposes of this invention, to have longest dimensions with the diameter limitations set forth above.

As indicated above, the polymeric adsorbents useful in the process to this invention are normally crosslinked and in the case of functionalized polymers, are uniformly functionalized as conventional for materials available heretofore in the ion exchange or affinity chromatography fields. However, water-insoluble, uncrosslinked or partially functionalized materials may also be suitable. For instance, ion exchange polymers functionalized with an ionogenic group near the particle surface, e.g., a monolayer of ion exchange groups about the periphery of the bead, are useful. Lightly crosslinked or surface-crosslinked beads having low water solubility are also effective.

Generally, the particle size of the polymeric adsorbent should be small enough so that the adsorbents will flow and partition in the aqueous system and feed lines (the latter when the method is practiced as part to a more general processing sequence, involving feed from other manufacturing steps, possibly with subsequent separation and additional purification, both batch and continuous modes). However, the particle size must not be so small that the complex cannot be supported on or retained by a filtration medium for separation of the complex from the aqueous medium. Generally, for conventional filtration, the particle size should be at least about 1.0 micrometer; for membrane filtration, the particle size may normally range from about 0.1 to about 1.5 micrometer. On the other hand, the particle size must not be too large; otherwise, the material will not adsorb effectively on the polymeric particles and the particles will not remain suspended in the aqueous extraction system during partitioning and therefore will not carry adsorbed material efficiently into a phase or to an interface.

Liquid-liquid aqueous extraction systems for the separation or purification of biomaterials are also influenced by the pH of the aqueous medium, particularly for separation of biomaterials having characteristic isoelectric points. Thus, in addition to complexing as a result of electrostatic attraction, complexing can also be controlled by the pH of the extraction medium. For example, a serum globulin having an isoelectric point at pH 4.4 will have an enhanced absorption on a positively charged polymeric adsorbent if the pH of the system is modified so that the globulin acquires a negative charge. The globulin thus is not only attracted more effectively to the adsorbent but also will tend to coat the adsorbent.

Additional enhancement of partitioning is achieved by combining polymeric adsorbents having opposite charges. The result is flocculation of the adsorbents, which in turn in many cases will magnify absorption of a material, thus carrying more of the adsorbed material into one of the phases or interfaces upon partitioning. The oppositely charged adsorbents may be combined either before addition to the extraction system (such as the resin floc of U.S. Pat. No. 200,695) or in situ upon sequential addition to the system.

Following partitioning, the liquid phases are separated by decanting, suction or other technique, and the complex is removed from the liquid by filtration (e.g.; microfiltration or ultrafiltration) centrifugation or other suitable means. The product is then recovered from the filtrate or from the complex (if adsorbed on the polymeric adsorbent) by one or more conventional desorption treatments such as elution, salting-out, centrifugation or membrane filtration (ultrafiltration or microfiltration). In some cases, particularly if the polymeric adsorbent is an ion exchange resin, desorption of product from the complex can be achived by treatment with another ion exchange resin having the same charge as that of the carrier resin of the complex. In some cases, also, adjustment of pH of a liquid environment containing the complex will be sufficient for desorption. After recovery from the extraction system, the product may be further purified by repetition of the liquid-liquid extraction method of the invention or by other treatments known in the art.

The following examples will further illustrate the invention but without necessarily limiting the scope thereof, it being understood that those skilled in the art will be able to vary the conditions set forth therein, including the addition of other substances and amounts, without departing from the spirit and scope of the invention as set forth in the appended claims. In the examples, all parts and percentages are by weight unless otherwise specified.

EXAMPLE 1

This example illustrates the ability of small particle size ion exchange resins to partition in liquid-liquid extraction systems, and the extent separation capacity, $C_{sep}$) of partitioning relative to molecular weight of PEG (Part B).

(A) Ten ml of polyethylene glycol 300 (PEG300) (30%) potassium phosphate buffer (PPB) (1.5 M) two-phase system was prepared with PEG300, pH 7.2 PPB, and various concentrations of ion exchange resins in 15 ml centrifuge tubes. The mixtures were shaken for 10 minutes and centrifuged for 10 minutes at 700 times gravity (700 ×g). The critical level of ion exchange resin concentration for the two-phase system was determined by measuring absorbance of the resin at 600 nm. As shown in Table 1A, strongly basic styrene resin and strongly acidic styrene resin partitioned into the bottom and the top phases, respectively. Strongly basic acrylic and weakly basic acrylic resins were concentrated at the interface.

(B) Ten ml of a polyethylene glycol molecular weight 8000 (PEG8000) (6%)/dextran molecular weight 40000 (DEX40000) (10%) two-phase system were prepared in pH 7.2, 10 mM potassium phosphate buffer (PPB) with various concentrations of ion exchange resins in 15 ml centrifuge tubes. The mixtures were shaken for 10 minutes and centrifuged for 10 minutes at 700 ×g. The separation capacities of this system were determined as described in Part A. As shown in Table 1B, the basic resins partitioned into the bottom phase and acid resin partitioned into the top phase.

TABLE 1A

| Type of Ion Exchange Resin | Separation Capacity, Csep (g resin/100 ml of system) | Partition Behavior |
|---|---|---|
| Strongly Basic Acrylic DVB$^a$ (0.1 micrometer)$^b$ | 1.0 | Interface |
| Weakly Basic Acrylic-DVB$^a$ (0.08 micrometer)$^b$ | 0.5 | Interface |
| Strongly Basic Styrene-DVB$^a$ (0.27 micrometer)$^b$ | 0.5 | Bottom Phase |
| Strongly Acidic Styrene-DVB$^a$ (0.22 micrometer)$^b$ | 2.5 | Top Phase |

$^a$crosslinked with divinyl benzene (DVB)
$^b$mean diameter of ion exchange resin (prepared as described in U.S. Pat. No. 4,380,590

TABLE 1B

| Type of Ion Exchange Resin | Separation Capacity, Csep (g resin/100 ml of system) | Partition Behavior |
|---|---|---|
| Strongly Basic Acrylic DVB$^a$ (0.1 micrometer)$^b$ | 1.5 | Bottom Phase |
| Weakly Basic Acrylic-DVB$^a$ (0.08 micrometer)$^b$ | 4.0 | Bottom Phase |
| Strongly Basic Styrene-DVB$^a$ (0.27 micrometer)$^b$ | 2.0 | Bottom Phase |
| Strongly Acidic | 1.05 | Top Phase |

TABLE 1B-continued

| Type of Ion Exchange Resin | Separation Capacity, Csep (g resin/100 ml of system) | Partition Behavior |
|---|---|---|
| Styrene-DVB[a] (0.22 micrometer)[b] | | |

[a]crosslinked with divinyl benzene (DVB)
[b]mean diameter of ion exchange resin (prepared as described in U.S. Pat. No. 4,380,590

EXAMPLE 2

Examples 2-4 illustrate partitioning of a negatively charged protein (BSA).

Ten ml of PEG8000 (6%)/DEX40000 (10%) aqueous two-phase system was prepared by adding PEG8000, DEX40000, bovine serum albumin (BSA, 0.1%, wt/v) in pH 7.2 potassium phosphate buffer (PPB, 10 mM) and various concentrations of strongly basic acrylic ion exchange resin (mean diameter =0.1 micrometer) to 15 ml centrifuge tubes, shaking for 10 minutes, and centrifuging for 10 minutes at 700 ×g. Concentrations of BSA and resin were determined spectrophotometically by measuring the absorbance at 280 nm and 600 nm, respectively.

Table 2 shows the improvement of BSA partitioning with strongly basic acrylic resin in the PEG/DEX two-phase system. The PEG/DEX system partitioned BSA mostly into the DEX-rich bottom phase but left some in the PEG-rich top phase. When strongly basic acrylic resin was added, the concentration of BSA in the PEG-rich top phase decreased with increase in the concentration of resin. Strongly basic acrylic resin at a concentration of 0.02% transferred BSA completely from the top to the bottom phase. Resin partitioned completely into the bottom phase and sedimented BSA resin flocs were observed on the bottom of the centrifuge tube in the DEX-rich bottom phase above strongly basic acrylic resin concentration of 0.01%, indicating that the separation of resin-absorbed BSA was feasible.

TABLE 2

| Concentration of Ion Exchange Resin (%, wt/v) | Partition Behavior | Concentration of BSA in PEG-Rich Top Phase (%, wt/v) |
|---|---|---|
| 0.000 | — | 0.0121 |
| 0.0005 | Bottom Phase | 0.0093 |
| 0.001 | Bottom Phase | 0.0073 |
| 0.002 | Bottom Phase | 0.0059 |
| 0.005 | Bottom Phase | 0.0054 |
| 0.010 | Bottom Phase (+)[a] | 0.0012 |
| 0.015 | Bottom Phase (++)[a] | 0.0003 |
| 0.020 | Bottom Phase (++)[a] | 0.0000 |
| 0.040 | Bottom Phase (+++)[a] | 0.0000 |

[a]+ indicates the relative amounts of sedimented flocs on the bottom of the dextran-rich bottom phase

EXAMPLE 3

The procedure of Example 2 was repeated except weakly basic acrylic resin (mean diameter =0.08 micrometer) was used instead of strongly basic acrylic resin. Table 3 shows the improvement of BSA partitioning by weakly basic acrylic resin.

Weakly basic acrylic resin also improved the partition of BSA in PEG/DEX two-phase system. The concentration of BSA in the PEG-rich top phase decreased with increase in the concentration of resin. With 0.01% weakly basic acrylic resin, the concentration of BSA in the top phase decreased to less than half that in the absence of resin. At the concentration of resin higher than 0.02%, flocs were formed and sedimented on the bottom of the centrifuge tube in the DEX-rich phase indicating that protein-resin flocs were easily recoverable.

TABLE 3

| Concentration of Ion Exchange Resin (%, wt/v) | Partition Behavior | Concentration of BSA in PEG-Rich Top Phase (%, wt/v) |
|---|---|---|
| 0.000 | — | 0.0121 |
| 0.001 | Bottom Phase | 0.0116 |
| 0.002 | Bottom Phase | 0.0102 |
| 0.005 | Bottom Phase | 0.0082 |
| 0.010 | Bottom Phase | 0.0050 |
| 0.020 | Bottom Phase (+)[a] | — |

[a]Formation of flocs on the bottom of the centrifuge tube in the dextran-rich bottom phase

EXAMPLE 4

The procedure of Example 2 was repeated except that strongly basic styrene resin (mean diameter =0.27 micrometer) was used instead of strongly basic acrylic resin. The partition behavior and improvement of BSA partitioning in PEG/DEX two-phase system are shown in Table 4, demonstrating that the strongly basic styrene resin improved the partitioning of BSA in the PEG 8000 (6%)/DEX40000 (6%) two-phase system. The concentration of BSA in the PEG-rich top phase decreased with increase in the concentration of resin. BSA concentration in the top phase decreased by a factor of 13 at 0.08% resin. Flocs formed and sedimented at a resin concentration above 0.04%.

TABLE 4

| Concentration of Ion Exchange Resin (%, wt/v) | Partition Behavior | Concentration of BSA in PEG-Rich Top Phase (%, wt/v) |
|---|---|---|
| 0.000 | — | 0.0121 |
| 0.001 | Bottom Phase | 0.0113 |
| 0.002 | Bottom Phase | 0.0082 |
| 0.005 | Bottom Phase | 0.0079 |
| 0.010 | Bottom Phase | 0.0093 |
| 0.020 | Bottom Phase | 0.0077 |
| 0.040 | Bottom Phase (+)[a] | 0.0060 |
| 0.060 | Bottom Phase (++)[a] | 0.0037 |
| 0.080 | Bottom Phase (++)[a] | 0.0008 |
| 0.100 | Bottom Phase (+++)[a] | 0.0009 |

[a]+ indicates the relative amounts of sedimented flocs on the bottom of the dextran-rich bottom phase

EXAMPLE 5

This example illustrates partitioning of a positively charged protein (lysozyme). Ten ml of PEG8000 (6%)/DEX40000 (10%) aqueous two-phase system was prepared by adding PEG8000, DEX40000, and lysozyme (0.1%, wt/v) in pH 7.2 potassium phosphate buffer (PPB) with the various concentrations of strongly acidic styrene resin (mean diameter =0.2 micrometer) of Example 1 in 15 ml centrifuge tubes. The mixtures were shaken for 10 minutes and centrifuged for 10 minutes at 700 ×g. Concentrations of lysozyme and resin were determined spectrophotometically by measuring the absorbance at 280 and 600 nm, respectively.

Table 5 shows the partition behaviors of lysozyme and strongly acidic styrene resin in PEG/DEX two-phase system. At the optimum concentration ratio to resin to lysozyme (1.4 g resin/g lysozyme), lysozyme was concentrated on the interface in PEG8000 (6%)/DEX40000 (10%). Below the optimum concentration ratio of resin to lysozyme, the resin partitioned into the DEX-rich bottom phase. Above the optimum concentration ratio of resin to lysozyme, the resin was partitioned into the PEG-rich top phase. As also shown in Example 1B, all of the acidic resin partitioned into the top phase.

Lysozyme is a basic protein, pKa =11.0. At pH 7.2 lysozyme has net positive charges. In the presence of excess lysozyme, lysozyme-resin flocs are formed and partition into the bottom phase because the flocs have net positive charges, like the strongly basic resins of Example 1. In the presence of excess resin, the lysozyme-resin flocs partition into the top phase (like strongly acidic resin itself) because the flocs have a net negative charge. Therefore, lysozyme can be concentrated at the interface by controlling the amount of resin added.

TABLE 5

| Concentration of Ion Exchange Resin (%, wt/v) | Partition Behavior of Flocs | Lysozyme ($A_{280}$) Top | Lysozyme ($A_{280}$) Bottom | Concentration IER ($A_{600}$) Top | Concentration IER ($A_{600}$) Bottom |
|---|---|---|---|---|---|
| 0 | — | 1.757 | 2.666 | — | — |
| 0.10 | Bottom Phase | 0.983 | — | 0.010 | — |
| 0.11 | Bottom Phase | 0.783 | — | 0.000 | — |
| 0.12 | Bottom Phase | 0.700 | — | 0.000 | — |
| 0.13 | Interface Phase | 0.698 | 0.869 | 0.000 | 0.062 |
| 0.14 | Interface Phase | 0.655 | 0.600 | 0.122 | 0.004 |
| 0.15 | Top Phase | — | 0.589 | — | 0.013 |
| 0.16 | Top Phase | — | 0.633 | — | 0.000 |
| 0.17 | Top Phase | — | 0.481 | — | 0.000 |
| 0.18 | Top Phase | — | 0.493 | — | 0.000 |
| 0.19 | Top Phase | — | 0.431 | — | 0.002 |
| 0.20 | Top Phase | — | 0.398 | — | 0.003 |

EXAMPLE 6

The experiments of this example were performed substantially as described in Examples 2-5. The cell concentration in each of the experiments of this example was 1 g/liter of broth, and the resin concentration was 0.5 g/liter of broth. The total volume used in each experiment was 10 ml. In the first experiment, the partitioning of beta-galactosidase from E. coli with the strongly basic styrene - DVB resin of Example 1 was studied. The results are given in Table 6A from which it will be apparent that most of the beta-galactosidase partitioned into the PEG-rich top phases in the various phase systems tested and that PEG3350 (6)/PPB (0.8M) gave the highest yield. However, PEG1450 (15%)/PPB (1.0M) showed the highest purification fold. It was also observed that cellular debris obtained by centrifugation of the disrupted E. coli cells was concentrated in PPB phase. Accordingly, enhanced, selective recovery of beta-galactosidase is evident.

In other experiments the resin was added to sonicated E. coli cell suspensions. Adsorption was carried out in 10 mM PPB at pH 5.6 to increase yield and adsorption of beta-galactosidase on the resin. Cell debris/beta-galactosidase/resin flocs were then collected by centrifugation. Additional PPB was added to the sedimented flocs and the resulting suspension was shaken for 30 minutes to increase desorption yield. After the desorption, PEG was added, and the suspension was shaken for 10 minutes, and centrifuged to form a two-phase system. The highest yield and purification fold of beta-galactosidase was achieved at pH 6.1 as shown in Table 6B.

The partition behavior of beta-galactosidase from Asp. niger was found to be different from that from E. coli (Table 6C). Contrary to the beta-galactosidase from E. coli, most of the Asp. niger beta-galactosidase partitioned into the PPB-rich bottom phase, and only at high concentrations of low molecular weight PEG (MW 300 and 600) did the Asp. niger enzyme partition into the top phase (Table 6D).

Accordingly, it appears that the beta-galactosidase produced by E. coli and Asp. niger are quite different in their surface properties. The enzyme produced by E. coli is more hydrophobic than that from Asp. niger.

TABLE 6A

Partition of beta-galactosidase from E. coli DH1 extract in PEG/PPB two-phase system

| Composition Two-Phase System | Activity Top Phase | Activity Bottom Phase | Yield (%) | Purification fold |
|---|---|---|---|---|
| PEG1450(15%)/PPB(1.0M) | 831 | 32 | 69 | 3.0 |
| PEG3350(6%)/PPB(0.8M) | 928 | 19 | 77 | 2.2 |
| PEG3350(15%)/PPB(1.0M) | 839 | 11 | 73 | 2.1 |
| PEG8000(12%)/PPB(0.7M) | 842 | 23 | 70 | 2.0 |

Activity of cell extract = 5993 units/ml extract
Volume of cells added to two phase system - 0.2 ml = 1199 units

TABLE 6B

Influence of pH on the partition of beta-galactosidase in a two-phase system

| pH of PPB | Activity recovered | Yield (%) | Purification fold |
|---|---|---|---|
| 5.9 | 2100 | 69 | 3.4 |
| 6.1 | 2820 | 89 | 4.6 |
| 6.3 | 2720 | 86 | 4.3 |
| 6.5 | 2540 | 80 | 4.2 |
| 7.0 | 2160 | 68 | 3.4 |

TABLE 6C

Partition of beta-galactosidase from Asp. niger in PEG/PPB systems

| Composition of Two Phase System | | Activity Top Phase | Activity Bottom Phase | Partition Coefficient |
|---|---|---|---|---|
| PEG300(20%)/PPB(1.5M) | | 290 | 181 | 1.6 |
| PEG600(20%)/PPB(1.5M) | | 29 | 300 | 0.097 |
| PEG1450(15%)/PPB(1M) | | 6 | 439 | 0.014 |
| (20%)/ | (1.2M) | 7 | 425 | 0.016 |
| (25%)/ | (1.5M) | 24 | 328 | 0.073 |
| PEG3350(15%)/PPB(0.8M) | | 6 | 455 | 0.013 |
| (20%)/ | (0.8M) | 5 | 432 | 0.012 |
| PEG8000(12%)/PPB(0.8M) | | 6 | 467 | 0.013 |
| (12%)/ | (0.7M) | 7 | 452 | 0.015 |
| (15%)/ | (0.8M) | 10 | 445 | 0.022 |
| (20%)/ | (0.8M) | 21 | 417 | 0.050 |
| (25%)/ | (1.0M) | 38 | 391 | 0.097 |

TABLE 6C-continued

Partition of beta-galactosidase from *Asp. niger* in PEG/PPB systems

| Composition of Two Phase System | | Activity Top Phase | Activity Bottom Phase | Partition Coefficient |
|---|---|---|---|---|
| (25%)/ | (1.2M) | 69 | 528 | 0.13 |

Activity of 0.1% beta-galactosidase solution = 122.7 units/ml
Total volume of system = 5 ml - 613 units

TABLE 6D

Partition of beta-galactosidase from *Asp. niger* in PEG/PPB systems

| Composition of Two Phase System | Activity Top Phase | Activity Bottom Phase | Partition Coefficient |
|---|---|---|---|
| PEG300(25%)/PPB(1.5M) | 324 | 12 | 27 |
| PEG300(30%)/PPB(2.4M) | 230 | 5 | 46 |
| PEG300(30%)/PPB(1.5M) | 245 | 6 | 41 |
| PEG300(30%)/PPB(1.8M) | 198 | 3 | 66 |
| PEG300(35%)/PPB(1.8M) | 241 | 5 | 48 |
| PEG300(35%)/PPB(2.0M) | 212 | 6 | 35 |
| PEG300(40%)/PPB(2.0M) | 168 | 7 | 24 |
| PEG600(40%)/PPB(1.5M) | 51 | 41 | 1 |
| PEG600(35%)/PPB(1.5M) | 89 | 5 | 18 |
| PEG600(40%)/PPB(2.0M) | 250 | 6 | 42 |

Activity of 0.1% beta-galactosidase solution = 122.7 units/ml
Total volume of system = 5 ml = 613 units

EXAMPLE 7

The procedure of Example 5 was repeated using a ground, weak-acid acrylic ion exchange resin. The partition behavior and improved separation of lysozyme in PEG/DEX two-phase systems are illustrated in Table 7. The results demonstrate that a weakly acidic acrylic resin improved the partitioning of lysozyme in the PEG600 (20%)/DEX40000 (15%) two-phase system. The concentration of lysozyme in the PEG-rich top phase decreased with increasing concentration of this weak-acid acrylic resin, which directed the partition of lysozyme into the DEX-rich bottom phase. The partition yield of lysozyme increased from 60% (in the top phase) to 100% (in the bottom phase) with resin.

TABLE 7

| Cation Exchange Resin Concentration (g resin/g lysozyme) | Concentration of Lysozyme in Top Phase (%, wt/v) | Partition* Yield (%) |
|---|---|---|
| 0.0 | 0.086[t] | 60[t] |
|  | 0.107[b] | 38[b] |
| 0.2 | 0.082 | 47 |
| 0.4 | 0.051 | 67 |
| 0.6 | 0.031 | 80 |
| 0.8 | 0.034 | 78 |
| 1.0 | 0.032 | 80 |
| 1.5 | 0.004 | 97 |
| 2.0 | 0.001 | 100 |
| 2.5 | 0.001 | 100 |
| 3.0 | 0.001 | 100 |

*Partition yield in the dextran-rich bottom phase
[t] Top Phase (volume of top phase = 65% of total system volume)
[b] Bottom phase (volume of bottom phase = 35% of total system volume

EXAMPLE 8

This example illustrates the recovery of enzyme activity (lysozyme) from resins in liquid-liquid extraction. Ten ml of PEG8000 (6%)/DEX40000 (10%) aqueous, two-phase system was prepared by mixing PEG8000, DEX40000 and lysozyme (0.1%, wt/v) in pH 7.2 potassium phosphate buffer with 0.15% (wt/v) weakly acidic acrylic group resin of Example 7 in the 15 ml centrifuge tube. The mixture was shaken for 10 minutes and centrifuged for 120 minutes at 700 ×g. The PEG-rich top phase was replaced with potassium phosphate buffer. The pH of the mixture was adjusted with 2 N NaOH, the mixture was shaken for 20 minutes and centrifuged for 5 minutes at 15,000 ×g. The lysozyme activity of the supernatants was determined spectrophotometrically from their effect upon a *Micrococcus lysodeiktus* lysate: the supernatant was diluted 100-fold in 0.5 molar potassium phosphate buffer solution having a pH of 7.0, 0.1 ml of the dilute solution was added to 2.9 ml of the lysate at 75° C., and the change in absorbance (at 450 nm) with time was measured. This absorbance change, in absorbance units per minute, was multiplied by the dilution of the supernatant to obtain a lysozyme activity value for the original supernatant. Table 8 shows the results of these measurements. Using 200 mM potassium phosphate at pH 10.1, the recovery yield was as high as 89% of the total activity of lysozyme initially added into the two-phase systems.

TABLE 8

| pH | Total Activity Recovered ($A_{450}$/minute)* | Recovery Yield (%) |
|---|---|---|
| Free Lysozyme | 21,500 | — |
| 100 mM Potassium Phosphate | | |
| 7.3 | 2,000 | 9 |
| 8.0 | 6,900 | 32 |
| 9.9 | 13,500 | 63 |
| 10.7 | 14,800 | 69 |
| 11.6 | 14,500 | 67 |
| 12.1 | 13,000 | 61 |
| 200 mM Potassium Phosphate | | |
| 7.1 | 12,100 | 56 |
| 8.1 | 16,900 | 79 |
| 10.1 | 19,100 | 89 |
| 11.3 | 18,400 | 86 |
| 11.7 | 18,300 | 85 |

*Absorbance units per minute, on basis of original supernatant concentration.

We claim:

1. A liquid-liquid extraction method of separating or purifying a product, said method comprising:
   (A) agitating an aqueous solution or dispersion of (1) the product mixed with other material, (2) a plurality of water soluble, mutually immiscible substances in amounts effective to maintain separation of multiple aqueous liquids phases, and (3) a water-insoluble particulate polymeric absorbent having particle diameters in the range of from about 0.01 to about 10 micrometers and capable of adsorbing either the product or the other material to form a reversible complex, whereby the adsorbent reversibly binds the adsorbable material to form a complex;
   (B) causing the system resulting from step (A) to separate into the said multiple liquid aqueous phases, whereby a predominant portion of the complex partitions into one of the phases or to an interface thereof; and
   (C) recovering the product from the complex, or from the aqueous phase or interface in which it has concentrated.

2. The method of claim 1 wherein the polymeric adsorbent comprises an ion exchange resin or a non-functionalized crosslinked or uncrosslinked polymer precursor thereof.

3. The method of claim 2 wherein the polymeric adsorbent is in the form of latex particles.

4. The method of claim 2 wherein the polymeric adsorbent is in the form of ground particles.

5. The method of claim 1 wherein the product is a biomaterial.

6. The method of claim 5 wherein the biomaterial is selected from proteinaceous substances, amino acids, enzymes, steroids, hormones, carbohydrate polymers, antibodies, antigens, cells and cell fragments.

7. The method of claim 1 wherein the product comprises a charged substance, the polymeric adsorbent carries a charge opposite that of the product, and the adsorbent binds the product to form the complex.

8. The method of claim 1 wherein the said other material comprises a charged substance, the polymeric adsorbent carries a charge opposite that of the charged substance, and the adsorbent binds the charged substance to form the complex.

9. The method of claim 1 wherein the product is recovered by one or more treatments selected from elution, salting out, centrifugation and filtration.

10. The method of claim 1 wherein the substances effective for separation into multiple liquid phases comprise extraction pairs selected from polyethylene glycol/dextran, polyethylene glycol/potassium phosphate and polyethylene glycol/magnesium sulfate.

11. The method of claim 7 wherein the products is an acidic proteinaceous material and the polymeric adsorbent is an ion exchange resin.

12. The method of claim 11 wherein the ion exchange resin is an anion exchanger.

13. The method of claim 11 wherein the acidic proteinaceous material is bovine serum albumin.

14. The method of claim 7 wherein the product is a basic proteinaceous material and the polymeric adsorbent is an ion exchange resin.

15. The method of claim 14 wherein the ion exchange resin is a cation exchanger.

16. The method of claim 14 wherein the basic proteinaceous material is lysozyme.

17. The method of claim 11 wherein the acidic proteinaceous material is beta-galactosidase.

* * * * *